(12) United States Patent
Whitmer et al.

(10) Patent No.: US 10,120,763 B1
(45) Date of Patent: Nov. 6, 2018

(54) GRADUATED OBJECT-LEVEL VERSION EXPIRATION

(71) Applicant: EMC Corporation, Hopkinton, MA (US)

(72) Inventors: Ray David Whitmer, Pleasant Grove, UT (US); Ajit Kumar Verma, Pleasant Grove, UT (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 224 days.

(21) Appl. No.: 15/081,470

(22) Filed: Mar. 25, 2016

(51) Int. Cl.
  *G06F 17/00* (2006.01)
  *G06F 11/14* (2006.01)
(52) U.S. Cl.
  CPC ...... *G06F 11/1451* (2013.01); *G06F 11/1461* (2013.01); *G06F 2201/835* (2013.01)
(58) Field of Classification Search
  CPC ....... G06F 11/1451; G06F 17/30; G06F 17/00
  USPC .................................................. 707/600–899
  See application file for complete search history.

(56) References Cited

U.S. PATENT DOCUMENTS

| 7,979,649 | B1  |   | 7/2011 | Thiam |
|---|---|---|---|---|
| 2007/0136381 | A1 | * | 6/2007 | Cannon ............... G06F 11/1451 |
| 2011/0012836 | A1 |   | 1/2011 | Zhang |
| 2011/0239152 | A1 |   | 9/2011 | Jensen |
| 2012/0215743 | A1 |   | 8/2012 | Triantafillos |

OTHER PUBLICATIONS

U.S. Appl. No. 15/081,531, filed Mar. 25, 2016, Ray David Whitmer, et al.
U.S. Appl. No. 15/081,531, dated May 25, 2018, Office Action.

* cited by examiner

*Primary Examiner* — Isaac M Woo
(74) *Attorney, Agent, or Firm* — Workman Nydegger

(57) ABSTRACT

In one example, a method for managing backed up data includes marking a current backup version to indicate that the current backup version has no expiration time, and then determining a currency span for a backup version that immediately precedes the current backup version. Next, one or more curtains crossed by the currency span are identified, each curtain being associated with a respective expiration rule. The expiration rules are then applied to the immediately preceding backup version, and an expiration time assigned to the immediately preceding backup version based on application of the expiration rules.

21 Claims, 6 Drawing Sheets

GRADUATED OBJECT-LEVEL VERSION EXPIRATION

RELATED APPLICATIONS

This application is related to U.S. patent application Ser. No. 15/081,531, entitled CREATION AND IMPLEMENTATION OF DESIGNATED TIME POINTS IN A VERSION EXPIRATION ENVIRONMENT, filed the same day herewith, and incorporated herein in its entirety by this reference.

FIELD OF THE INVENTION

Embodiments of the present invention generally concern management of data backups. More particularly, at least some embodiments of the invention relate to systems, hardware, computer-readable media, and methods directed to the implementation and use of policies and rules for governing the management of data backups.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

While there is little question about the need to back up important data, the ongoing accumulation of multiple versions of one or more files or other objects can result in the storage of a vast amount of data, much of which may never even be accessed or used. This may not be a particularly significant problem, for example, at an individual file level where a user may hit 'SAVE' multiple times during the creation or editing of a document, but this ongoing accumulation of file or object versions can be a significant problem, for example, at an enterprise level.

In particular, saving specific versions of backed up files can be valuable, but preserving every possible version pushes the system towards inefficiency, chaos, and irrelevance. To illustrate, if a user has a database file that is continuously updating such that the database file gets backed up once every minute, 1440 backups will be created each day for that database file. Depending upon the retention policy, the user may keep 1440 backups per day, extending back over the entire retention period, and totaling over half a million versions in a year.

A further complication is the way in which a particular user or customer may choose to back up their data. For example, some backups may be performed continuously. That is, the backup system backs up changes as soon as the changes are perceived by the backup system. This continuous backup approach can lead to the rapid generation of large amounts of backed up data, particularly in an enterprise context.

As another example of data storage methodologies, objects such as files may be backed up independently of each other, or may be backed up as a group as part of a container backup. The former approach can be used where there is a need to maintain independence between files. Thus, for example, different files may be stored in different respective containers and, as such, backups can be performed at a relatively high level of granularity. However, management of the respective backups of multiple independent files may be significantly more complicated than management of a single container that contains multiple files. On the other hand, management of backed up data at a container level, for example, is relatively easy to implement but reduces flexibility since the files in the container are managed as a group, rather than individually.

Moreover, some data backup customers prefer to maintain data backups that go back in time for relatively long periods, such as a year or more. However, if all of the backups are retained, and if continuous backups are performed, it is possible that millions of versions of a single file may be retained. Thus, the amount of backed up data can grow rapidly, resulting in ever-increasing storage costs for the enterprise, often with little or no return on the investment. In particular, these costs are often not well spent since the majority of versions that are backed up may never be accessed or used.

One possible approach to gain a measure of control over the amount of data that is stored might involve the use of expiration times/dates for one or more of the backups. For example, a backup can be set to expire 30 days after creation of the backup. Thus, backups would be automatically deleted on an ongoing basis, based on their expiration date.

However, one problem with setting an expiration date for an object version based on the creation date of the object version relates to the number of versions that may exist for that object. In particular, while this approach has some attractiveness due to its simplicity, it fails to take into account the number of existing versions of that object. For example, if the backup that is set to expire in 30 days is the only backup of a file and/or is the most recent backup of that file, it makes little sense to delete that backup, notwithstanding that 30 days may have passed.

As the foregoing example illustrates, a file may be deleted too early because this approach fails to account for the number of backed up versions of the file. A related problem with such an approach is that a file may be deleted too late, for example, only after multiple additional backup versions, not all of which may be needed, have been created and stored.

In view of problems such as those noted above, and/or others, it would be useful to define and implement rules and policies to determine at what point in time a particular version of an object can be deleted from storage. As well, it would be useful to be able to define rules and policies which, when implemented, can automatically reduce the number of stored versions of an object as the current version of that object ages. Finally, it would be useful to be able to determine the point in time when a particular version of an object expires and can be deleted from backup, and such a determination is based not only on the time of creation of that particular version but also the time of creation of the next successive version.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
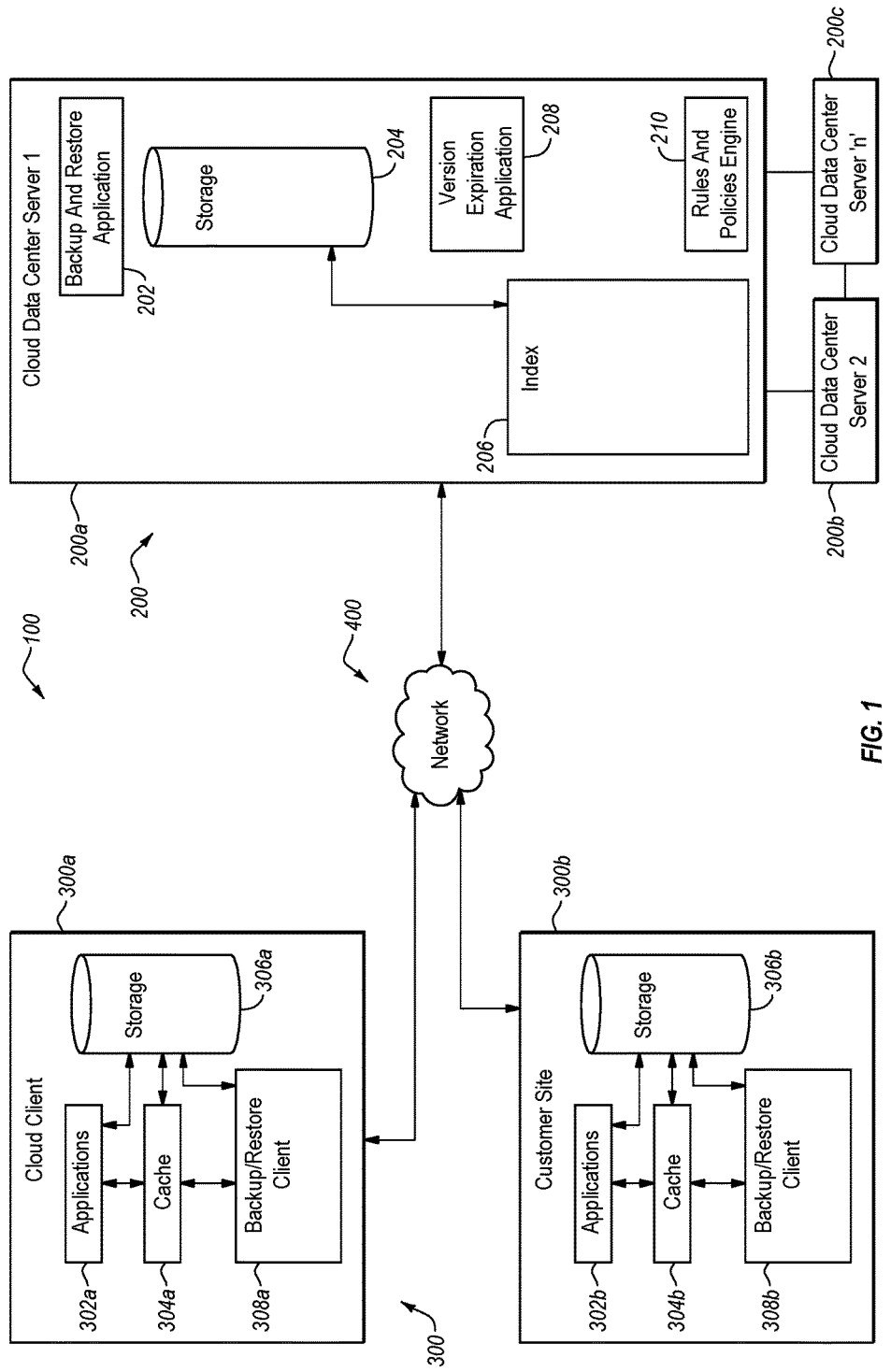
FIG. 1 is directed to aspects of an example operating environment for at least some embodiments.

Embodiments of the present invention generally concern management of data backups. More particularly, at least some embodiments of the invention relate to systems, hardware, computer-readable media, and methods directed to the implementation and use of policies and rules for governing the management of data backups. Such management of data backups may involve, among other things, the use of backup version expirations, which can be applied automatically by way of the policies and rules. Embodiments of the invention can be employed, for example, in connection with backed up data residing in a cloud storage environment, but the scope of the invention is not limited to such applications and environments.

Embodiments of the invention can be employed in connection with any type of data. As used herein, the term 'data' is intended to be construed broadly and includes, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data. While some embodiments of version expiration disclosed herein can be applied at the object level, the scope of the invention is not limited to those example embodiments. More generally, version expiration can be applied at any level of data.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection and later restoration.

In connection with the examples noted immediately below, as well as the examples disclosed elsewhere herein, it should be noted that the use of the term 'file' is employed simply as a convenient way to illustrate aspects of embodiments of the invention. However, and as noted elsewhere herein, the scope of the invention is not limited to the use of files nor to any other particular form, group, set, combination or string, of data.

In general, at least some embodiments of the invention may provide for a gradual consolidation, over time, of backup versions of an object. By way of illustration, the number of retained backups for a particular user in one embodiment may be reduced to 12 backups over the past day, 7 daily backups over the last week, 5 weekly backups over the last month, 3 monthly backups, 4 quarterly backups, and 10 yearly backups, for a total of only 41 versions, with more expired versions awaiting consolidation in the dependency chain.

In at least some embodiments, rules, and policies which include one or more rules, are defined and implemented that can be used to determine at what point in time a particular backup version of an object can be deleted from storage, that is, an expiration time. This determination may be based not only on the time of creation of that particular backup version but additionally based on the time of creation of the next successive backup version. Such rules and policies can be employed, for example, to automatically reduce the number of stored backup versions of an object as the current version of that object ages. For example, the use of the polices and rules can be used to assign expiration times to one or more backup versions, such that when an expiration time arrives, the backup version, or backup versions, to which the associated rule applies, is/are automatically deleted.

In general, an expiration time for a particular backup can be determined based on a set of parameters that comprises, or consists of (i) the time that the particular backup version was created, and (ii) the time that the next successive backup version was created. More particularly, these two creation times can be used to determine what may be referred to herein as a currency span, that is, the time span over which the particular backup version was the current version. Put another way, the length of the currency span is the amount of time that has elapsed between the creation time of that particular object version and the creation time of the next newer version of the same object stored in the same media location. A currency span can extend over any length of time. Thus, a currency span can be short, one minute for example, or long, one year for example, or can be any other length.

As well, a variety of rules, any one or more of which may or may not be default rules, can be defined and implemented in connection with various embodiments of the invention. Some rules may be generally applicable, while other rules may be specific to one or more designated points in time that fall within a currency span of a backup version.

In general, a rule defines when a backup version will expire by causing the addition of a particular amount of time to the life of that backup version, at the end of which, that backup version expires. In this way, application of the rule determines the expiration time of the backup version. More specifically, at least some rules take effect at one or more designated time points within the time interval defined by the currency span. Each of these designated time points may be referred to herein as a 'curtain,' and a given currency span may be crossed by as few as no curtains, or may be crossed by multiple curtains. The addition of time to the lifespan of a backup version, as dictated by a rule, occurs as a result of that backup version having crossed one or more curtains during its currency span. Some example rules are discussed below.

In some embodiments, a first rule, which can be a default rule, is defined which specifies that the current backup version, regardless of its age, is never deleted so long as it remains the current backup version. Thus, this first rule does not necessarily apply at any particular curtain, but instead is generally applicable, and at all times. In these and/or other embodiments, a second rule, which may also be a default rule, can additionally be defined which specifies that any backup version that is created will live a specified minimum amount of time, such as at least one day, after its creation. This second rule does not necessarily apply only at a particular curtain, or curtains, nor to a particular backup version but, instead, is generally applicable to all backup versions, and at all times.

As noted above, the current backup version remains alive and unexpired until such time as a new backup version is created. Once the new backup version has been created, the currency span can then be determined, since the creation date of the previously current backup version, and the creation date of the new backup version, are both known. When the bounds of the currency span have been determined, each of the designated time points, or curtains, a determination is made as to which rule(s) apply to the time frame defined by the currency span. Since each curtain is associated with a rule, this determination can be made by examining the curtain(s) to determine which rule(s) apply at each curtain.

Once the applicable rules have been identified, each of those rules can be used to calculate a respective expiration time for the formerly current backup version. In some embodiments at least, whichever rule results in the longest life, that is, the latest expiration, for that backup version is then applied to that backup version.

Thus, each time a new backup version is created, an expiration time is assigned to the immediately preceding backup version, with the result that there is only ever one backup version that has no expiration time assigned, namely, the current backup version. Every other backup version has an expiration time and will expire, and be deleted from storage, upon the arrival of that time.

It should be noted here that the term immediately preceding backup version refers to the backup version relative to which the current backup version is the next successive backup version in time, and the time gap between the immediately preceding backup version and the current backup version need not have any particular length. Although not normally the case, it is possible that backup versions can be created in the time gap between the immediately preceding backup version and the current backup version. As noted elsewhere herein, such backup versions may have an 'invalid' bit set so that they are not considered in computing expiration times.

In some embodiments, an expiration date of a backup version can be recalculated in certain circumstances, notwithstanding that the backup version had already been slated for expiration and deletion. For example, if a backup version should be deleted, whether automatically or manually, the currency span of the immediately preceding version may be recomputed since the currency span of that immediately preceding version has now been lengthened to cross the curtain(s) that had previously fallen within the currency span of the now-deleted immediately following version. Correspondingly, the immediately preceding version may, once again, become the current version as a result of the deletion of the immediately following version.

It should be noted that the aforementioned concepts can apply both to the current version of a backup, and to backup versions whose expiration date has been set. For example, if the current version is deleted, the immediately preceding version becomes the current version and its currency span will be extended to cover any curtains crossed by the previously current version. The same general approach can be taken if the deleted version is other than the current version.

Finally, because each curtain may have one or more rules associated with it, a change to the length of the currency span may result in a corresponding change to the expiration of the back version whose currency span changed. In particular, since the currency span now embraces curtains that it formerly did not, those curtains implicate still other rules that can affect the expiration date of that backup version.

Advantageously then, at least some embodiments of the invention provide for de-cluttering backed-up versions, so as to optimize the size, speed, and relevance of listings and repositories, while also promoting durability as an important purpose of backup. The ability to consolidate backup versions on a variable scale may enable limitation of risk-accumulating dependency chains of incremental backups, where each backup in the chain contributes its own risk of loss to the risk of loss of the entire chain. As older versions are thinned out, risk decreases and durability increases. Approaches such as this may, among other things, restore significant durability for active files over the existing system where risk-contributing dependency chains are much longer.

A. Example Operating Environments

In general, embodiments of the invention may include and/or be implemented in an operating environment that includes various clients and/or other devices that generate and/or cause the generation of data that is backed up at a cloud storage site and/or other site. In at least some embodiments of the invention, any of the methods disclosed herein can be performed in whole or in part at a cloud storage site, although that is not necessarily required.

As used herein, the term client is intended to have broad scope and embraces, among other things, any system, device, or combination of those, by way of which direct access to cloud based storage can be achieved. As such, one or more clients may be in a cloud system, and/or one or more clients may be located at a customer site. Similarly, the term backup server is intended to have broad scope, and embraces, among other things, any backup server and associated storage device or system that are located remotely relative to a client. As such, one or more backup servers may be part of a cloud based storage system, such as a cloud datacenter, for example.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a cloud datacenter 200 that may include one or more cloud datacenter servers, such as datacenter servers 200*a*, 200*b* and 200*c*. For the purposes of the discussion, only datacenter server 200*a* will be discussed but it should be understood that datacenter servers 200*b* and 200*c* may be similar, or identical, to datacenter server 200*a* in terms of operation and/or configuration. In at least some embodiments, two or more of the datacenter servers 200*a*-200*c* can communicate with each other, although that is not required. In general, the datacenter server 200*a* is implemented as a backup server that is able to communicate with one or more clients 300a and 300b, either directly or by way of an a communications network 400, to transmit data to, and receive data from, the clients 300a and 300b. Examples of backup servers include, but are not limited to, the EMC Avamar server, and the EMC NetWorker server.

With continued reference to FIG. 1, further details are provided concerning the example datacenter server 200a. As indicated, the datacenter server 200a may include a backup and restore application 202 that cooperates with a backup client, discussed below, residing on one or more clients 300 such as a cloud client 300a and customer site 300b, to backup data generated by and/or at the direction of applications residing at, or accessible by, the clients 300. The datacenter server 200a also includes, or has access to, storage 204 that stores backup data for one or more clients. The data stored for each client can include one or more backups of that client, or a portion of that client. To facilitate management of backup and restore processes, the datacenter server 200a may also include one or more backup indexes 206 that include information, such as an expiration time for example, concerning each backup version stored at the server 200a. As well, the datacenter server 200a includes a version expiration (VE) application 208 which may perform any of the disclosed methods, in any combination. The version expiration application 208 can be separate from, or integrated with, the backup and restore application 202. Finally, the datacenter server 200a may include a rules and policies engine 210 which may generate rules and policies for determining expiration times for one or more backup versions stored at, and/or accessible by, the datacenter server 200a.

With continued reference to FIG. 1, and as noted earlier, a cloud datacenter including one or more datacenter servers may communicate with one or more clients, two examples of which are denoted at 300a and 300b, respectively. As the clients 300a and 300b may share a number of similarities, only client 300a is addressed in the following discussion.

Among other things, the client 300a may include one or more applications 302a, a local cache 304a, local storage 306a, and a backup/restore client 308a. With reference to the applications 302a, example applications include, but are not limited to, word processing, email, database management, and any other application(s) capable of generating, and/or causing the generation of, data that can be backed up at the cloud datacenter 200.

B. Example Host Configuration

Figure 2:
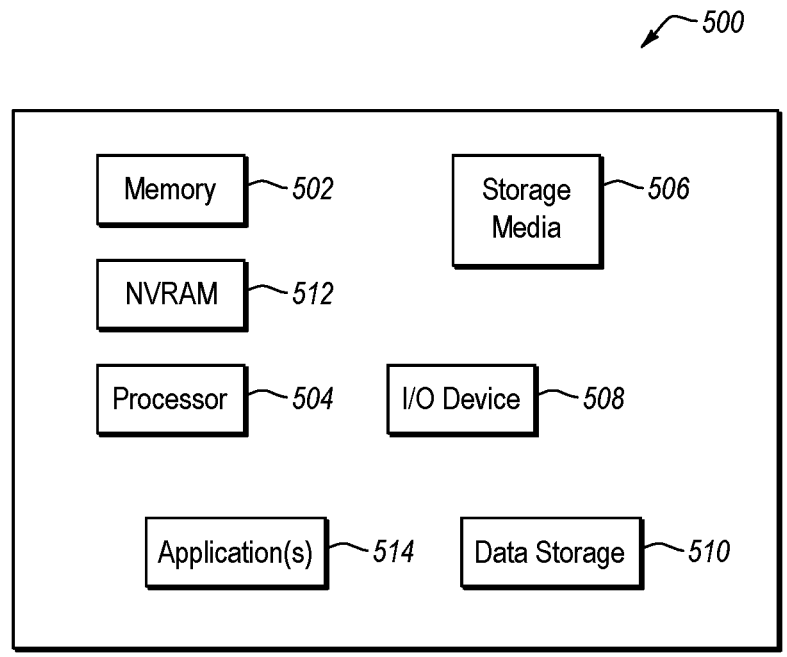
FIG. 2 is directed to an example computing device that may be employed in connection with some embodiments of the invention.

With reference briefly to FIG. 2, one or more of the backup server 200 and client 300 can consist of, comprise, or take the form of, one or more physical computing devices, one example of which is denoted at 500 in FIG. 2. In the example of FIG. 2, the computing device 500 includes a memory 502, one or more hardware processors 504, non-transitory storage media 506, I/O device 508, data storage 510, and NVRAM 512. As well, one or more applications 514 are provided that comprise executable instructions. Such executable instructions can take the form, for example, of any one or more of a backup/restore application, a backup/restore client, a version expiration application, and a rules and policies engine. Additional, or alternative, applications can likewise be included in the applications 514.

C. Aspects of Backup Version Expiration

It should be understood that the disclosure of the Figures of the present disclosure is presented only by way of example, and variations and modifications of those examples will be apparent to a person of ordinary skill in the art having the benefit of the present disclosure and, as such, those variations and modifications are considered to be within the scope of this disclosure.

Figure 3:
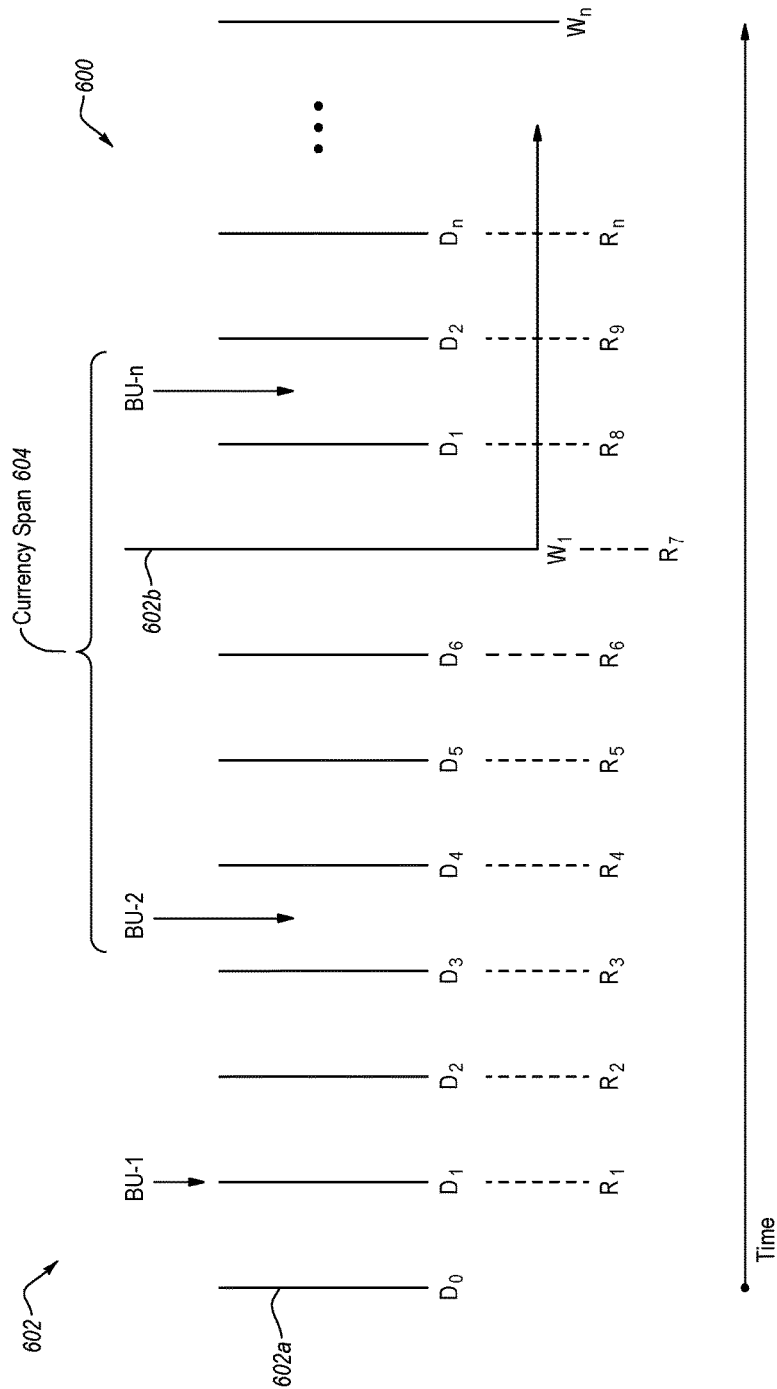
FIG. 3 discloses aspects of an example currency span of a backup version.
Figure 4:
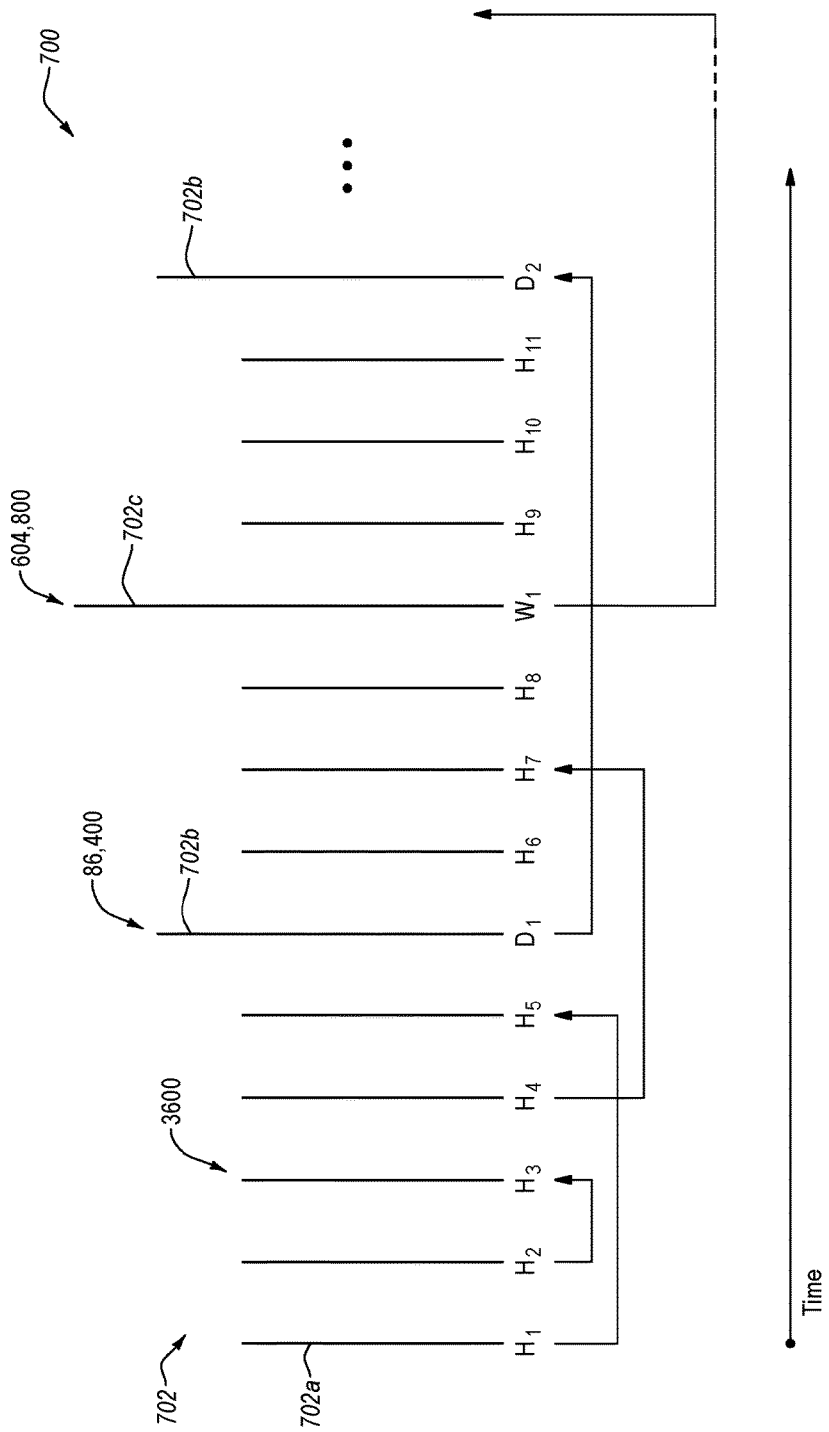
FIG. 4 discloses aspects of an example arrangement of curtains in a version expiration configuration.
Figure 5:
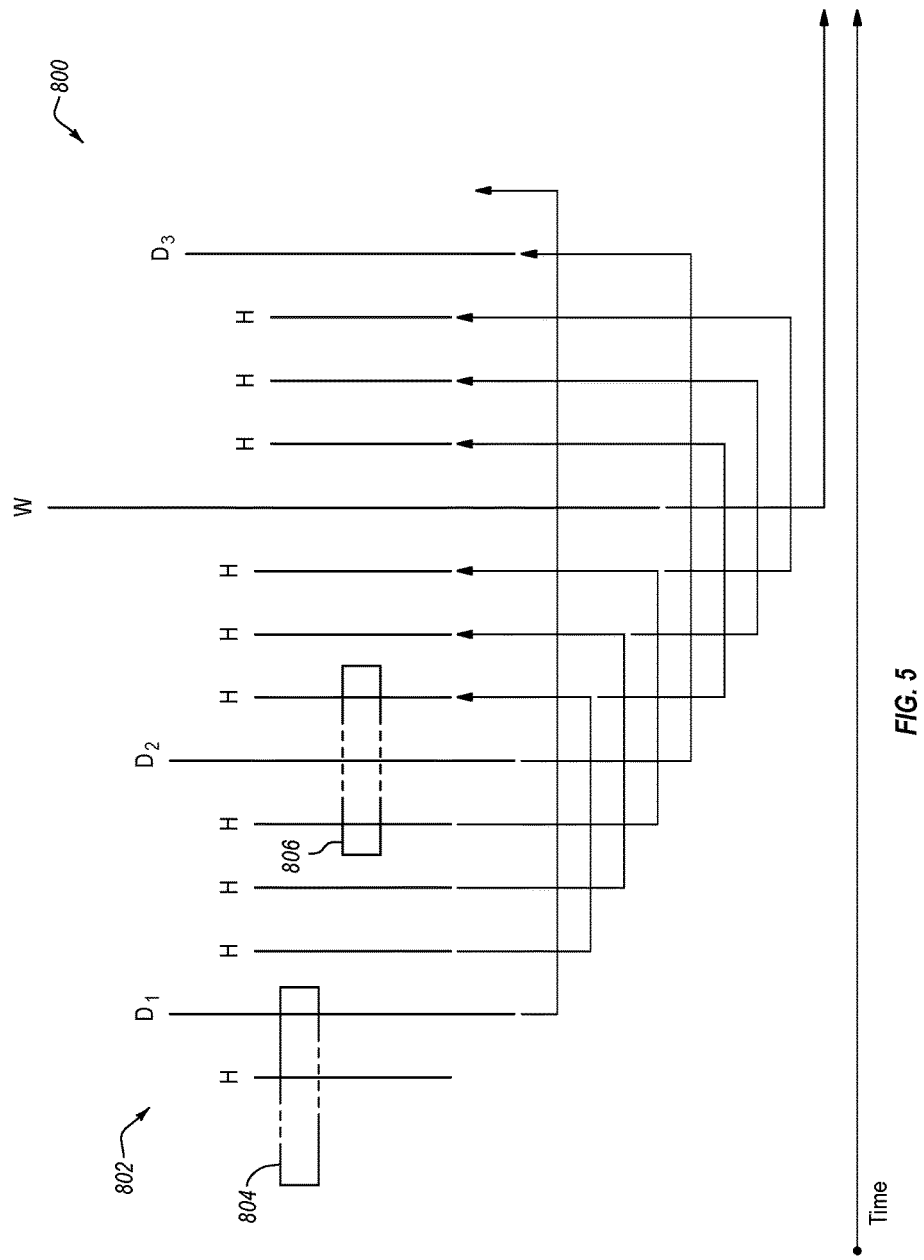
FIG. 5 discloses further aspects of an example arrangement of curtains and associated currency spans.

With reference now to FIGS. 3-5, some aspects of example embodiments of the invention are addressed. Turning first to FIG. 3, a version expiration configuration (VEC) 600 is disclosed. As indicated the VEC 600 can include a variety of different designated time points, or curtains, 602. The illustrated example includes daily curtains "D" 602a and weekly curtains "W" 602b. Further, the configuration in FIG. 3 includes curtains 602a that occur daily so that there are seven such curtains 602a that fall within the first week W1. However, in another configuration, there may be fewer or more curtains within the first week W1, such as a curtain every other day for example, or curtains only on odd/even days. In still another example, hourly curtains may be employed within one or more of the days of the first week W1, or at any other time(s). As these examples illustrate, there is no limit to the number, frequency, types, or combinations of curtains that can be employed in connection with embodiments of the invention. Moreover, one or more curtains can be set by default, while others can be user-specified. As well, curtains can be removed either automatically or based on user input. Thus, it will be appreciated that the scope of the invention is broad and is not limited to the example configurations disclosed herein.

As further indicated in FIG. 3, each curtain 602 may be associated with a particular rule "R", or rules, that specify how a backup version whose currency span crosses that curtain 602 will be treated. That is, the rules "R" determine how much time may be added to the life of that backup version and, thus, the rules "R" form the basis for defining the expiration time of that backup version. One, some, or all, of the rules "R" can be default, user-defined, or otherwise specified.

With continued reference to the example of FIG. 3, and for the purposes of illustration, a first backup version BU-1 was created at the beginning of day 2, followed by the creation of another backup version BU-2 created sometime during day 4. At this point then, BU-1 is no longer the current version, and BU-2 is now the current version. Subsequently, BU-n is created sometime on day 2 of week 2 such that BU-n is now the current version and the default 'never expire' rule now applies to BU-n. Moreover, as BU-2 is no longer the current version, having been replaced in that role by BU-n, the 'never expire' default rule no longer applies to BU-2, and an expiration time can thus be assigned to BU-2. In this example, BU-2 may be referred to as the immediately preceding backup version since it is the backup version after which the next backup version to be created is the current backup version, BU-n in this case.

Because the creation time of BU-2 and the creation time of BU-n are known, the length of the currency span 604 of BU-2, which is needed for determination of the expiration time of BU-2, can be readily established. As can be seen from FIG. 3, several curtains 602 are embraced within the currency span 604. In particular, four daily curtains 602a and one weekly curtain 602b fall within the currency span 604. Thus, rules R4, R5, R6, R7 and R8 must be applied to BU-2 to determine which rule, when applied, results in the most distant expiration time for BU-2.

To illustrate with a simple example involving a comparison of just two rules, if rule R6 specifies that a backup version crossing daily curtain D6 will have its life extended by one day, and if rule R7 specifies that a backup version crossing weekly curtain W1 will have its life extended by one month, then rule R7 will be applied to BU-2 since rule R7 results in the most distant expiration time for BU-2. After application of rule R7, the expiration time is set for BU-2, and no further action is required to ensure that BU-2 will expire on arrival of the expiration time.

It should be noted with regard to the foregoing example that it is not required that the most distant expiration time be set for a backup, although that is desirable in some instances. More generally, the expiration time implicated by any of the applicable rules can be applied to the backup, and various criteria can be employed to inform the selection of a particular rule for application to the backup. Such criteria may include, but are not limited to, the creator of the file that is backed up, and the type of application to which the backup pertains. Any other additional and/or alternative criteria can be employed.

As is evident from FIG. 3, and the other disclosure herein, objects with sparsely occurring versions not well-aligned with the expiration rules nonetheless do not lose essential versions to fill out the coverage timeline at rule-designated points in time. This is because the expiration rules apply to the currency spans of all versions that will always cross the same points in time, whether there are few backup versions or many backup versions of a particular object, or other grouping of data or piece of data. Unless other provisions are made, the latest backup version never expires however old because the currency span is only ended by a newer backup version. The expiration can be computed on each current version when the next version appears and may be generally constant after that, thus permitting mass expirations to be reliably gathered into processing containers. All rules can be applied efficiently and equally to the version, and the longest resulting expiration may be applied to the backup version.

With continued reference to FIG. 3, as well as reference to FIGS. 4 and 5 discussed below, it can be seen that most recent backup version, which may also be referred to herein as a patch, of any file has infinite retention unless explicitly expired. During the appending of a new backup version, the graduated expiration application will calculate and update the expiration of only the most recent previous backup version, if any. Hence, the new update requirement will only incur an overhead on a relatively small percentage of files that have multiple backup versions.

Turning now to FIG. 4, further details are provided concerning a VEC 700 that includes some example implementations of one or more curtains 702 such as may be employed in one or more embodiments of the invention. As noted herein, each curtain 702 may be associated with a respective rule that can be used to facilitate determination of the expiration time of a particular backup version. Some examples of rules are noted above. Yet other rules can specify, by way of illustration only, that most versions expire in a day, but the first existing backup version of the hour (that is, the backup version with a currency span that crosses the top of the hour) has its expiration extended to at least three days from then, a backup version with currency spanning a daily point in time expires at least two weeks from that point, the current version on Saturday at noon, that is, the version that was current at that time, expires at least two month later, unless it is the first Saturday of the month, in which case that current version expires six months later. As these additional examples illustrate, there is no practical limit to the different rules, and combinations of rules, that can be defined and implemented.

In general, time periods of expiration rules can be based on common calendar periods, graduated and nested to expire relatively more aggressively without sacrificing immediate granularity. For example, daily backups for a week, weekly backups for a month, monthly backups for a quarter, and quarterly backups for a year totals 19 versions, whereas, by way of comparison, daily backups for a year totals 365 versions. Neither the 19 versions nor the 365 versions estimates allow for more than one backup per day, which would again accumulate to be significantly more numerous without backup version expiration than with it.

With continued reference to the particular example of FIG. 4, details are provided concerning some example curtains. In general, the curtains, or designated points in time, can be defined using ISO time syntax for year, month, week, day, and time by replacing any numeric fields with sequence expansions, producing simple schedules like 10 minutes past any hour, midnight every first Sunday of the month or half past noon Saturday every third week of the year. The same technique can be applied to any calendar type, although the initial implementation offers standard Gregorian calendar, week of year, and week of month calendars. Further details concerning the creation and implementation of curtains in a VEC environment are provided in the application references in the 'Related Applications' section hereof.

As indicated in FIG. 4, a variety of hourly curtains "H" 702a can be defined, as well as daily curtains "D" 702b, and weekly curtain "W" 702c. In general, the curtains reflect the respective rules with which they are associated. As a first example, the rule associated with curtain H1 is such that any backup version whose currency span crosses H1 will have its life extended by 4 hours, that is, to curtain H5. This is indicated by the arrow extending from H1 to H5. A similar extension would be obtained by a backup version whose currency span crosses H4.

As another example, the rule associated with curtain H2 is such that any backup version whose currency span crosses H2 will have its life extended by 1 hour, that is, to curtain H3. This is indicated by the arrow extending from H2 to H3. Thus, a backup version whose currency span extended across only H1 and H2 would have its life extended by 4 hours since, as between H1 and H2, 4 hours is the longest extension of life that is possible, and once the backup version reached the end of its extended life at H5, the backup version would then expire.

Similar considerations may apply to the daily curtain D1. In particular, and as indicated in FIG. 4, the rule associated with curtain D1 is such that any backup version whose currency span crosses D1 will have its life extended by 8 days, that is, past curtain D2. This is indicated by the arrow extending from D1 to D2.

Finally, as collectively indicated in FIGS. 3 and 4 and discussed in more detail in connection with FIG. 5, the rules associated with each of the curtains may correspond with time extensions applied in such a way that that the lives of various backup versions overlap each other and/or are nested within each other. For example, the time extension provided in connection with H1 overlaps the time extension provided in connection with H4. As another example, the time extension provided in connection with H2 is nested within the time extension provided in connection with H1. Thus, and depending on their respective currency spans and the rules embraced by those currency spans, back up versions may be expiring at a variety of different times and will all eventually be deleted from storage automatically at the end of their respective lives, with the exception of the current backup version which has no expiration time.

With reference now to FIG. 5, further details are provided concerning a VEC 800 that includes some example implementations of one or more curtains 802 such as may be employed in one or more embodiments of the invention. The VEC 800 may be similar to the VEC 600 and VEC 700 at least insofar as VEC 800 includes a combination of a variety of different curtains, such as, for example, hourly curtains "H," daily curtains "D" and weekly curtains "W."

In the illustrated example, several of the hourly curtains "H" are each associated with a respective rule that adds, in this illustrative example, 4 hours to the life of any backup version whose currency span crossed that hourly curtain "H." Thus, for a series of backup versions whose respective currency spans terminate at successive hourly curtains "H," those backup versions will expire in successive hours, thus ensuring that an overly large number of hourly backups are not retained, and are not retained for long periods of time.

On the other hand, the daily curtains "D" can be configured somewhat differently. In general, a first backup version whose currency span 804 crosses the first daily curtain D1 will have its life extended, in this illustrative example, for 3 days. However, a second backup version whose currency span 806 crosses the second daily curtain D2, but not the first daily curtain D1, will have its life extended, in this illustrative example, for only 2 days, that is, to D3. In this example arrangement then, the first backup version may persist longer than the second backup version. Alternatively, the respective rules could be defined such that the second backup version persists longer than the first backup version. More generally however, such rules and configurations can be set according to the needs of the enterprise or other entity, and the scope of the invention is not limited to the illustrative examples disclosed herein.

It should be noted that while example curtains such as hourly curtains, daily curtains, weekly curtains, monthly curtains, and yearly curtains are specifically discussed herein, the scope of the invention is not limited to these examples. By way of illustration, curtains of other granularities, such as bi-weekly curtains, quarterly curtains, and day-specific curtains, for example, can additionally or alternatively be used. More generally, there is no practical limit to the number and types of curtains that can be defined and implemented, nor to the amount of time that can elapse between a curtain and one or more other curtains. Thus, curtains of any number and properties can be employed. Likewise, curtains can recur on some periodic basis, and/or can occur ad hoc. Some additional examples of curtains are disclosed in the application referred to in the 'Related Applications' section hereof.

With general reference now to FIGS. 3-5, it will be appreciated that any number of variations can be implemented either singly, or in any combination. By way of example, an expiration date need not be calculated for each backup version. Rather, in some instances at least, an expiration date can be explicitly set that overrides the expiration date that would otherwise be calculated. As another example, if a backup version has an 'invalid' bit set for any reason, that backup version will be skipped and the creation time of that backup version will not be used in any currency span determinations. Moreover, a backup version can be marked to be skipped even if no 'invalid' bit has been set for that backup version. As a further example, a user may be permitted to disable expiration for one or more backups that are, or would otherwise be, scheduled to expire at a particular time. To continue with an additional example, one, some, or all, of the processes disclosed herein, such as the expiration processes for example, can be performed on an object-by-object basis. However, this is not required and embodiments can alternatively be performed on any other basis, such as a block-by-block, file-by-file, or any other basis or grouping of data. As well, expiration rules can be customized, for example, on an object-by-object basis based on criteria such file type, file location, or file ownership. Other example criteria for expiration rules are disclosed elsewhere herein.

D. Example Processes

Figure 6:
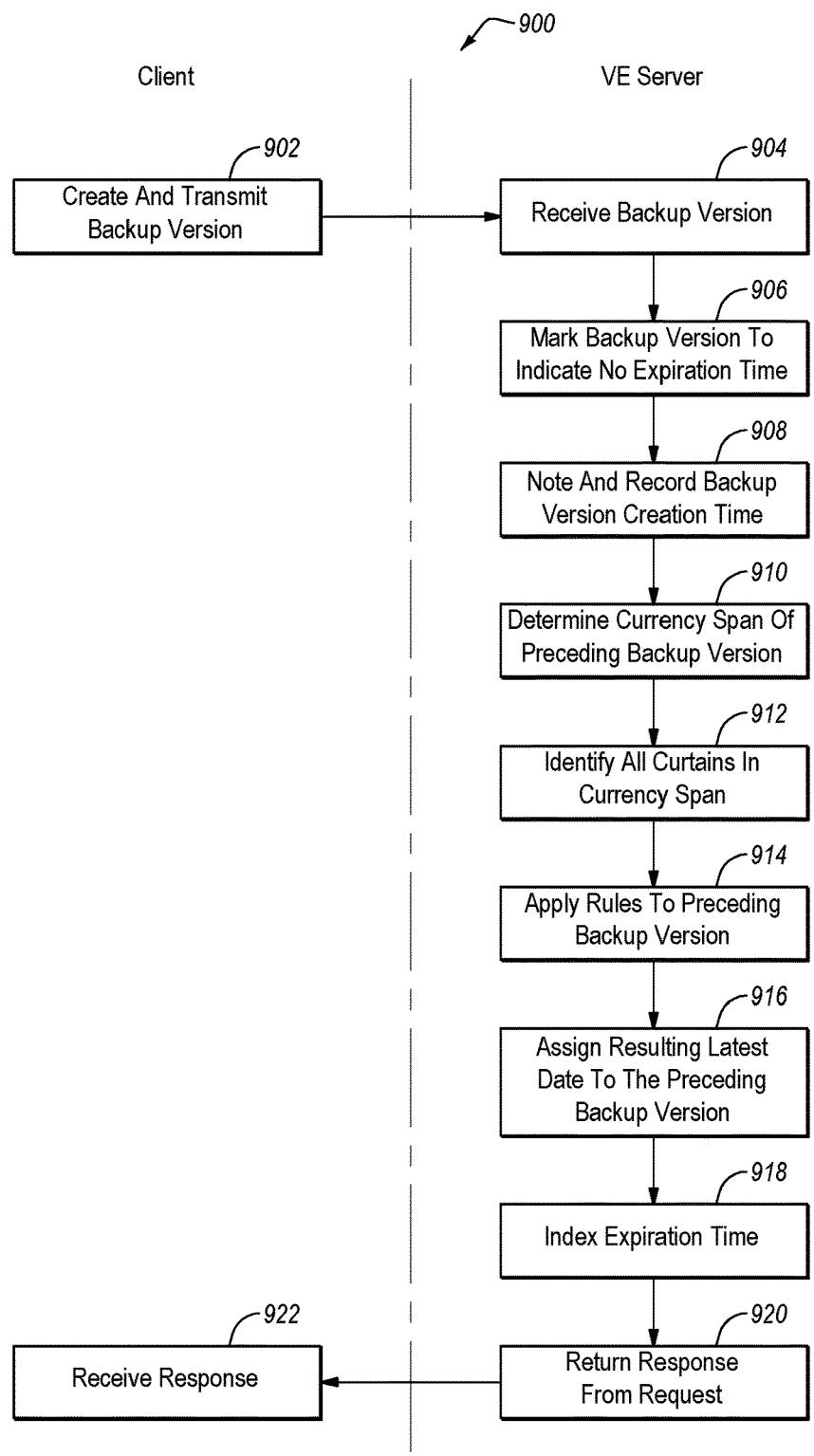
FIG. 6 discloses aspects of an example method for determining an expiration time of a backup version.

With attention now to FIG. 6, details are provided, concerning some example processes implemented by embodiments of the invention. One example of a process for version expiration is denoted generally at 900. Part, or all, of the example process 900, and variations thereof, can be performed by and/or at the direction of a server at a cloud data center. However, the scope of the invention is not limited to this example and, more generally, part or all of the method 900 can be performed by any other entity. Moreover, portions of the method 900 can be allocated amongst a plurality of entities and, accordingly, it is not required that the entire method 900 be performed at, or by, a single entity.

The process 900 may begin when a client, possibly in cooperation with a backup application and backup server, creates and transmits 902 a backup version that is to be stored and possibly used later for restoration of the backed up data to the client and/or one or more other targets. The backup version can be a full backup, an incremental backup, or any other type of backup. The backup version is then received 904 by a version expiration (VE) server for processing.

Because the received backup version is the most recent backup version, and in the absence of any default or other rules to the contrary, the received backup version is marked 906 to indicate that it has no expiration time. Before, at the same time, or after, such marking, the creation time of the backup version is noted and recorded 908. Because the creation time of the new backup version, and the creation time of the immediately preceding backup version are known, the currency span of the immediately preceding backup version can be determined 910. In particular, the elapsed time between the two creation times can be determined. Because the specific creation times of the two backup versions are known, the boundaries of the currency span of the immediately preceding backup versions are thus known as well. Any backup versions that have an 'invalid' bit set may be ignored in the determination 910.

Once the length, and boundaries, of the currency span are known, the currency span can then be examined and a determination 912 made as to which designated points in time, or curtains, fall within that currency span. As noted elsewhere herein, each curtain may have a rule associated with it that defines an amount of time to be added to the life of any backup version whose currency span crosses that curtain.

After the applicable rule, or rules, have been determined 912, each of the rules can then be applied 914 in turn to the immediately preceding backup version. Whichever rule, when thus applied, results in the latest expiration time for the immediately preceding backup version, is the controlling rule, and the expiration time defined as a result of application of that rule is assigned 916 to the immediately preceding backup version. Thus, that the immediately preceding backup version will expire when the assigned expiration time arrives. As well, the expiration time can be included in an index 918 (such as index 206 for example) in association with the backup version, or backup versions, to which that expiration time pertains. In this way, a user or other party or entity can examine the index to determine the status and anticipated expiration times of one, some, or all, backup versions.

Finally, a response to the initial request for storage of a backup version can be returned 920 to one or more recipients, such as the client for example 922, which indicates actual and/or expected expiration times for one or more backup versions, currency spans of one or more backup versions, total storage space occupied by unexpired versions, the number and type of curtains crossed by the current backup version, and/or any other information pertaining to one or more of the backup versions.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing backed up data, comprising:
   marking a current backup version to indicate that the current backup version has no expiration time;
   determining a currency span for a backup version that immediately precedes the current backup version;
   identifying one or more curtains crossed by the currency span, each curtain being associated with a respective expiration rule;
   applying each of the expiration rules to the immediately preceding backup version; and
   assigning an expiration time to the immediately preceding backup version based on application of the expiration rules.

2. The method as recited in claim 1, wherein each curtain corresponds to a respective designated point in time.

3. The method as recited in claim 1, wherein the currency span is determined based on a creation time of the immediately preceding backup version and a creation time of the current backup version.

4. The method as recited in claim 1, wherein the immediately preceding backup version is automatically deleted upon arrival of the expiration time of the immediately preceding backup version.

5. The method as recited in claim 1, wherein the method is performed on an object-by-object basis.

6. The method as recited in claim 1, wherein one of the curtains is one of an hourly curtain, daily curtain, weekly curtain, monthly curtain, or yearly curtain.

7. The method as recited in claim 1, wherein the expiration rule, when applied to a backup version, defines an amount of time to be added to the life of that backup version, and application of the expiration rule to a backup version also facilitates definition of an expiration time for that backup version.

8. The method as recited in claim 1, wherein two curtains of the same type have either the same, or different, respective associated expiration rules.

9. The method as recited in claim 1, wherein the expiration time applied to the immediately preceding backup version corresponds to the expiration rule whose application extends the life of the immediately preceding backup furthest into the future.

10. The method as recited in claim 1, wherein each of the expiration rules corresponds to no less than a minimum amount of time that can be added to the life of a backup version, wherein the minimum amount of time is non-zero.

11. A non-transitory storage medium having stored therein computer-executable instructions which, when executed by one or more hardware processors, implement and/or cause the implementation of the following processes:
  marking a current backup version to indicate that the current backup version has no expiration time;
  determining a currency span for a backup version that immediately precedes the current backup version;
  identifying one or more curtains crossed by the currency span, each curtain being associated with a respective expiration rule;
  applying each of the expiration rules to the immediately preceding backup version; and
  assigning an expiration time to the immediately preceding backup version based on application of the expiration rules.

12. The non-transitory storage medium as recited in claim 11, wherein each curtain corresponds to a respective designated point in time.

13. The non-transitory storage medium as recited in claim 11, wherein a length of the currency span is the amount of time that has elapsed between a creation time of the immediately preceding backup version and a creation time of the current backup version.

14. The non-transitory storage medium as recited in claim 11, wherein the immediately preceding backup version is automatically deleted upon arrival of the expiration time of the immediately preceding backup version.

15. The non-transitory storage medium as recited in claim 11, wherein the expiration rule, when applied to a backup version, defines an amount of time to be added to the life of that backup version, and application of the expiration rule to a backup version also facilitates definition of an expiration time for that backup version.

16. The non-transitory storage medium as recited in claim 11, wherein two curtains of the same type have either the same, or different, respective associated expiration rules.

17. The non-transitory storage medium as recited in claim 11, wherein the expiration time applied to the immediately preceding backup version corresponds to the expiration rule whose application extends the life of the immediately preceding backup furthest into the future.

18. The non-transitory storage medium as recited in claim 11, wherein the recited processes are performed on an object-by-object basis.

19. The non-transitory storage medium as recited in claim 11, wherein a number of stored backup versions declines as the age of the current backup increases.

20. The non-transitory storage medium as recited in claim 11, wherein each of the expiration rules corresponds to no less than a minimum amount of time that can be added to the life of a backup version, wherein the minimum amount of time is non-zero.

21. A server, comprising:
  one or more hardware processors; and
  the non-transitory storage medium as recited in claim 11.

* * * * *